United States Patent Office 3,378,729
Patented Apr. 16, 1968

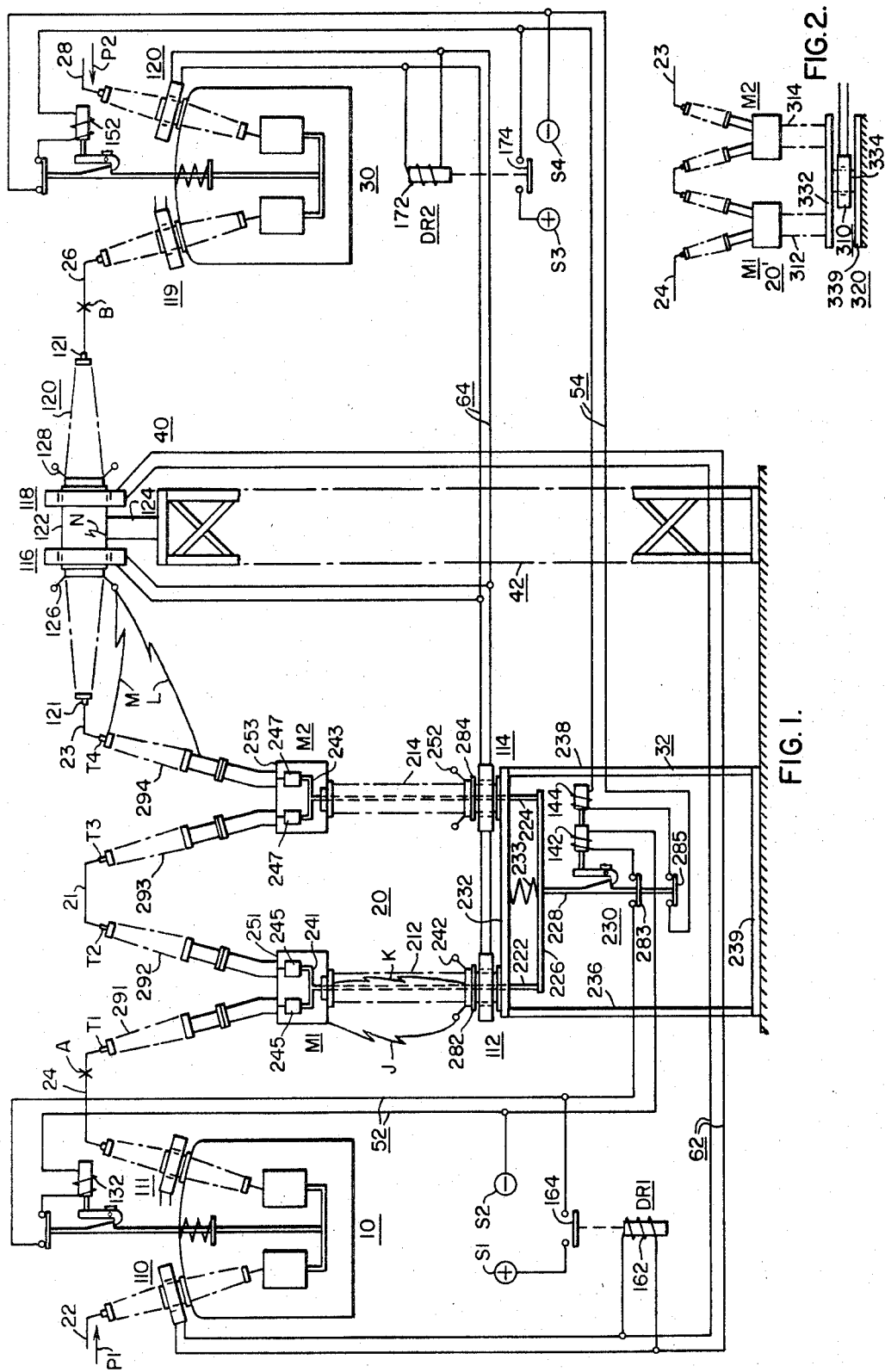

3,378,729
ELECTRICAL PROTECTIVE SYSTEM
Benjamin P. Baker, deceased, late of Monroeville, Pa., by Mellon National Bank and Trust Co., executor, Pittsburgh, Pa., assignor to Westinghouse Electric Corporation, Pittsburgh, Pa., a corporation of Pennsylvania
Filed Feb. 28, 1966, Ser. No. 531,016
9 Claims. (Cl. 317—58)

This invention relates to electrical protective systems and more particularly to circuit interrupters and the associated current transformer structures which form part of such systems.

In a conventional electrical protective system which is employed to control the flow of electric power by means of a plurality of circuit interrupters, it is desirable that the protective system distinguish between those fault conditions which are internal to a particular circuit interrupter, such as a bus tie breaker, and which may effect the ability of the circuit interrupter to interrupt current and those fault conditions which are external to a particular circuit interrupter and which do not impair the ability of a particular circuit interrupter to interrupt current. It is desirable that a protective system distinguish between these different types of fault conditions in order that the protective system actuate or trip only the necessary circuit interrupters open upon the occurrence of a particular fault condition. It is common practice in protective systems of the type described to arrange an electric power system into a plurality of zones to be protected with a current transformer winding being normally provided at each end of the zone and a differential protective relay connected in circuit relation with the current transformer windings at the opposite ends of each zone to respond to fault conditions which occur inside the associated zone and not to respond to fault conditions which are external to the associated zone. Adjacent protected zones in such protective systems are often arranged to overlap so that if a fault condition occurs in the portion of one zone which is overlapped by a portion of the adjacent zone, the differential protective relays associated with both zones will respond to such a fault condition. Where a circuit interrupter is provided to control the flow of electric power between two adjacent protected zones in an electric power system and where the construction of the circuit interrupter lends itself to such an arrangement, it may be convenient to provide a current transformer winding at each terminal of the circuit interrupter so that the internal circuit of the circuit interrupter coincides with the overlapping portions of two adjacent protected zones. When an internal fault condition occurs in such a circuit interrupter, the differential protective relays associated with the overlapping protected zones both respond to actuate or trip the appropriate circuit interrupters to prevent the flow of electric power to the circuit interrupter that has experienced an internal fault. A problem arises in providing current transformer windings at each terminal of certain types of circuit interrupters, particularly at very high voltage ratings, due to the factors of economy or space. One type of circuit interrupter which presents problems in this respect is the type which comprises a plurality of interrupting units or modules all supported on a common supporting means through separate insulating columns. It is, therefore, desirable to provide an improved electric protective system including circuit interrupters of the type just mentioned and associated current transformer structures.

It is an object of this invention to provide a new and improved transformer structure associated with a circuit interrupter.

Another object of this invention is to provide an improved electrical protective system including circuit interrupters and associated current transformer structures.

A more specifiec object of this invention is to provide an improved current transformer structure which is uniquely adapted for use with a circuit interrupter interrupter including a plurality of separate interrupting units which are all supported on a common supporting means through separate insulating columns.

Other objects of the invention will, in part, be obvious and will, in part, appear hereinafter.

For a fuller understanding of the nature and objects of the invention, reference should be had to the following detailed description taken in conjunction with the accompanying drawing, in which:

FIGURE 1 is a diagrammatic view of an electrical protective system embodying the principal features of the invention; and FIG. 2 is a diagrammatic view of a circuit interrupter and an associated current transformer structure which may be employed as an alternative structure for a portion of the electrical protective system shown in FIG. 1.

Referring now to the drawing and FIG. 1 in particular, there is illustrated one phase of an electric power system which would be typically part of a three-phase system designed for operation at any desired frequency, such as 60 cycles per second and any desired voltage, such as 230 kv. or 500 kv. for example. As illustrated, a plurality of electrical circuits, as indicated at 22 and 28, are interconnected through a plurality of circuit interrupters or circuit breakers 10, 20 and 30, a current transformer assembly 40 and the bus conductors, as indicated generally at 24 and 26. The electrical circuits 22 and 28 may be arranged to either supply electrical power to or to distribute electrical power from the bus conductors indicated at 24 and 26 through the circuit interrupters 10 and 30, respectively. The circuit interrupter or circuit breaker 20 is illustrated as a bus tie breaker which controls the flow of electric power between the bus conductors 24 and 26. It is to be understood that the circuit breakers 10 and 30 may be located adjacent to the circuit breaker 20 in an overall substation arrangement or that the circuit breakers 10 and 30 may be located remotely from the circuit breaker 20 in a particular application.

It is to be noted that, if a fault occurs which is external to the bus tie circuit breaker 20 on the bus conductor 24 as indicated at A, it is desirable that only the circuit breaker 10 and the circuit breaker 20 be tripped open on the opposite sides of such a fault condition by the associated protective control means in order to permit electric power to continue to flow to the bus conductor 26 through the circuit breaker 30. Similarly, if a fault should occur which is external to the bus tie circuit breaker 20 on the bus conductor 26 as indicated at B, it is desirable that only the circuit breaker 20 and the circuit breaker 30 be tripped open by the associated protective control equipment on the opposite sides of such a fault in order to permit electric power to continue to flow from the electric circuit 22 to the other bus conductor 24 through the circuit breaker 10. On the other hand, it is desirable that if a fault should occur which is internal to the bus tie circuit breaker 20 as indicated at J or K in FIG. 1, it is desirable that the circuit breakers 10 and 30 on the opposite sides of the circuit breaker 20, as well as the circuit breaker 20, be tripped open in order to prevent electric power from continuing to flow to such an internal fault in the bus tie circuit breaker 20 which might affect the interrupting ability of the bus tie circuit breaker 20.

More specifically, the circuit interrupters or circuit breakers 10 and 30 may be of generally conventional construction and my include a tripping device, such as a tripping solenoid or tripping coil, as indicated at 132 for the circuit breaker 10 and as indicated at 152 for the circuit breaker 30. The tripping solenoids 132 and 152 of the circuit breakers 10 and 30, respectively, may be energized to release a latching mechanism which otherwise holds the separable contacts of each circuit breaker in the closed position to thereby cause the operating mechanism of each circuit breaker to actuate the associated separable contacts to the open position. The circuit breakers 10 and 30 may include current transformer windings around the opposite terminals or bushings, as indicated at 110 and 111 for the circuit breaker 10, and as indicated at 119 and 120 for the circuit breaker 30 to cooperate with associated protective equipment, as will be explained hereinafter.

As shown in FIG. 1, the bus tie circuit breaker 20 is generally of the type which includes a plurality of interrupting units or modules mounted on a common supporting means through a plurality of separate insulating columns with the separable contacts of all the interrupting units being electrically connected in series between the end terminals of the overall circuit breaker and may be of the type which is described in detail in copending application Ser. No. 374,708, now Patent No. 3,291,947, which was filed June 12, 1964 by Roswell C. Van Sickle and which is assigned to the same assignee as the present application. In particular, the circuit breaker 20 comprises a plurality of interrupting units or modules M1 and M2 which are supported on a common supporting means or framework, as indicated at 32, through the respective insulating columns 212 and 124 which are illustrated as being of the generally hollow cylindrical or tubular type and which may be made or formed from a suitable electrically insulating material, such as procelain. The interrupting unit M1 comprises separable contacts which are disposed in a metallic housing 251 which, in turn, is mounted on and supported by the associated insulating column 212. The separable contacts of the interrupting unit M1 may include a pair of relatively stationary contacts 245 which are spaced from one another and which are electrically connected or bridged by a relatively movable, bridging contact member 241 when the circuit breaker 20 is in the closed position. The stationary contacts 245 of the interrupting unit M1 may be electrically connected to the opposite conducting terminal T1 and T2 through the insulating bushings indicated at 291 and 292 which are mounted on the housing 251 of the interrupter M1. Similarly, the interrupting unit M2 may include a pair of relatively stationary, spaced contacts 247 which are disposed in an associated metallic housing 253 which is mounted on and supported by the associated insulating column 214 with the stationary contacts 247 being electrically connected or bridged by an associated relatively movable, bridging contact member 243 when the circuit breaker 20 is in the closed position. The stationary contacts 247 of the interrupting unit M2 may be electrically connected to the associated conducting terminals T3 and T4 through the associated insulating bushings 293 and 294, respectively, which are mounted on top of the housing 253, as shown in FIG. 1. The separable contacts of the interrupting units M1 and M2 are electrically connected in series when the circuit breaker 20 is in the closed position by the conducting member 21 which is electrically connected to the conducting terminals T2 and T3 of the circuit breaker 20. The conducting terminal T1 of the circuit breaker 20 is electrically connected to the bus conductor indicated at 24, while the conducting terminal T4 at the opposite end of the circuit breaker 20 is electrically connected to the current transformer assembly 40 through a conducting member 23, for reasons which will be explained hereinafter.

The supporting means or framework 32 as illustrated in FIG. 1 includes a base 239, the vertical frame members 236 and 238, and a common supporting plate 232 which, in this instance, is disposed in a substantially horizontal position with the interrupting units M1 and M2 supported on the plate 232 through the insulating columns 212 and 214, respectively. The supporting framework 32 is preferably formed from a conductive, metallic material and is electrically connected to ground potential for safety and other reasons. The conductive housings or supports 282 and 284 may be disposed between the insulating columns 212 and 124, respectively, and the supporting plate 232 with the conductive housings 282 and 284 being generally hollow cylindrical or tubular in configuration similarly to the insulating columns 212 and 214. The current transformer windings 112 and 114 are disposed between the lower ends of the insulating columns 212 and 124, respectively, and the associated supporting plate 232 around the outer peripheries of the associated conductive housings 282 and 284, respectively, for reasons which will be explained hereinafter. It is to be noted that the conductive housings 282 and 284 extend vertically above the associated current transformer windings 112 and 114 and that the conductive housings or shielding structures 282 and 284 may be provided with spark gaps or arc horns, as indicated at 242 and 252, respectively, to insure that any fault along one of the insulating columns 212 or 214 will flow to the grounded supporting means 232 through one of conductive housings 282 or 284 which pass through the central openings in the current transformer windings 112 or 114, respectively, and that the magnetic flux produced by such a fault current will be inductively coupled with at least one of the current transformer windings 112 and 114.

In order to actuate the separable contacts of the interrupting units M1 and M2 between the open and closed positions, the circuit breaker 20 may include a common operating mechanism which comprises the insulating operating rods 222 and 224 which are operatively connected to the separable contacts of the respective interrupting units M1 and M2, respectively. The insulating operating rods 222 and 224 may be operatively connected to a common cross member 226 which, in turn, is operatively connected to an associated latching mechanism through an operating member indicated at 228. The separable contacts of the interrupting units M1 and M2 may be biased toward the open position but held in a closed position by the associated latching mechanism as indicated at 230 until one of the tripping devices or tripping solenoids, as indicated at 142 and 144, is energized to release the latching mechanism 230. Such a biasing means is indicated diagrammatically in FIG. 1 as an opening spring 233. The circuit breaker 20 may also include the normally closed contacts 283 and 285 which are actuated by the opening of the circuit breaker 20 to open and deenergize the associated tripping solenoids 142 and 144, respectively. It is to be noted that the insulating operating rods 222 and 224 also pass through the central openings in the associated current transformer windings 112 and 114, respectively, so that any fault along one of the insulating operating rods 222 or 224 inside the associated insulating columns 212 or 214, respectively, will flow to the grounded supporting framework 232 through one of the conductive housing or shielding structures 282 or 284 to thereby pass through the central opening in one of the associated current transformer windings.

In order to cooperate with the circuit breaker 20 and other protective control equipment in an overall electrical protective system, as will be explained hereinafter, the current transformer assembly 40 is disposed on one side of the circuit breaker 20 which, in this instance, is between the circuit breaker 20 and the circuit breaker 30. In particular, the current transformer assembly 40 comprises an elongated insulated bushing, as indicated at 120, which may be of the condenser type with a plurality of radially spaced conducting foil layers or may be of the gas insulated type. A conductive stud or elongated conductor 121 extends axially through the insulating bushing 120 with one end of the conductive stud 121 being electrically connected to the conducting terminal T4 of the circuit breaker 20 through the conducting member 23 and the other end of the conductive stud 121 being electrically connected to the bus conducter 26, as shown in FIG. 1. The current transformer assembly 40 includes a pair of axially spaced current transformer windings 116 and 118 which are disposed in side by side, spaced relationship intermediate the ends of the insulating bushing 120 around the periphery of the bushing 120 substantially at the mid-portion of the bushing 120.

In order to support the bushing 120 and the associated current transformer windings 116 and 118 intermediate the ends of the bushing 120 between thet current transformer windings 116 and 118, a grounded supporting framework 42 is provided which is preferably formed from a conductive, metallic material, such as steel. A conductive supporting member 124 is disposed between the upper end of the supporting framework 42 and a generally tubular, conductive supporting member 122 which is disposed between the current transformer windings 116 and 118 and the associated bushing 120. It is to be noted that the generally tubular conductive member 122 extends axially along the outer periphery of the insulating bushing 120 between the current transformer windings 116 and 118 and also extends beyond the current transformer windings 116 and 118 toward the ends of the bushing 120 in both directions to function as a conductive shielding member which may include the spark gaps or arc horns 126 and 128 at the opposite ends to insure that any fault which flows along the bushing 120, as indicated at M, will flow to the grounded supporting framework 42 through the conductive shielding member 122 and pass through the central opening in only one of the current transformer windings 116 and 118 to the grounded framework 42 which is disposed between the current transformer windings 116 and 118.

In order to actuate or control the operation of the circuit breakers 10, 20 and 30 upon the occurrence of predetermined fault conditions which may occur either internally or externally with respect to the bus tie circuit breaker 20, the differential protective relays DR1 and DR2 are provided. The operating coil 162 of the first differential protective relay DR1 is connected in circuit relation with the current transformer windings 110 and 118 of the circuit breaker 10 and the current transformer assembly 40, respectively, in a first differential protective circuit, as indicated at 62. The first differential protective relay DR1 includes a normally open contact 164 which is connected in circuit relation with a source of unidirectional potential as indicated at the terminals S1 and S2 to control the energization of the tripping solenoids 132 and 142 of the circuit breaker 10 and the circuit breaker 20, respectively, which are connected in a common tripping circuit, as indicated at 52 in FIG. 1. Similarly, the second differential protective relay DR2 includes an operating coil 172 which is connected in circuit relation with the current transformer winding 120 of the circuit breaker 30 and the current transformer windings 112 and 114 of the circuit breaker 20 in a second differential protective circuit, as indicated at 64. The second differential protective relay DR2 includes the normally open contact 174 which is connected in circuit relation with a source of unidirectional potential, as indicated at the terminals S3 and S4, to control the energization of the tripping solenoid 152 of the circuit breaker 30 and the tripping solenoid 144 of the circuit breaker 20 which are connected in a common tripping circuit, as indicated at 54 in FIG. 1.

Considering the operation of the overall electrical protective system shown in FIG. 1, it will be assumed initially that electric power, as indicated by the arrow P1 in FIG. 1, is flowing from the electric circuit indicated at 22 toward the electric circuit indicated at 28. It is to be noted that, in the absence of an internal fault in the circuit breaker 20 either along the outside of one of the insulating columns 212 or 214, as indicated at J, or along one of the operating rods 222 or 224, as indicated at K, the current transformer windings 112 and 114 are normally deenergized while current is flowing through the closed contacts of the interrupting units M1 and M2 of the circuit breaker 20. It is also to be noted that each of the current transformer windings included in the protective system shown in FIG. 1 is energized in accordance with the value of the current flowing in the primary conducting structure about which the particular current transformer winding is disposed. During normal operating conditions when power is flowing in the assumed direction from the electric circuit 22 to the electric circuit 28, the operating coil 182 of the first differential protective relay DR1 is substantially deenergized since the output currents of the current transformer windings 110 and 118 of the circuit breaker 10 and the current transformer assembly 40, respectively, are substantially vectorially equal or balanced with current merely circulating between the current transformer windings 110 and 118. Similarly, during normal operating conditions when power is flowing in the assumed direction from the electric circuit 22 to the electric circuit 28, the operating coil of the second differential protective relay DR2 is substantially deenergized since the current transformer windings 112 and 114 are deenergized in the absence of an internal fault in the circuit breaker 20, as previously mentioned, and the output currents from the current transformer windings 120 and 116 of the circuit breaker 30 and the current transformer assembly 40, respectively, are substantially vectorially equal or balanced with current merely circulating between the current transformer windings 116 and 120. As long as the operating coil of the differential protective relays DR1 and DR2 remain substantially deenergized, the tripping solenoids of the circuit breakers 10, 20 and 30 also remain deenergized since the energization of these tripping solenoids is controlled by the differential protective relays DR1 and DR2.

It is to be noted that the protected zones in the protective system as disclosed overlap by at least the axial spacing between the current transformer windings 116 and 118 of the current transformer assembly 40.

If a fault should occur externally of the circuit breaker 20 at the bus conductor structure 24, as indicated at A, between the circuit breaker 10 and the circuit breaker 20 while power is flowing in the assumed direction from the electric circuit 22 toward the electric circuit 28, the current transformer winding 110 which forms part of the differential protective circuit 62 and which is disposed at one end of a protective zone which extends from the current transformer winding 110 to the current transformer winding 118 of the current transformer assembly 40 will remain energized, while the current transformer winding 118 at the other end of the protected zone will be substantially deenergized with the output current from the current transformer winding 110 energizing the operating coil 162 of the first differential protective relay DR1. The energization of the operating coil 162 of the first differential relay DR1 will actuate the contact 164 to the closed position to thereby energize the tripping circuit 52 from the terminals S1 and S2. The tripping solenoids 132 and 142 of the circuit breakers 10 and 20 are thereby energized to trip the breakers 10 and 20 on the opposite sides of the fault A open to prevent the flow of electric power from the electric circuit indicated at 22 to the fault A. Similarly, if a fault should occur externally of the circuit breaker 20 and its associated current transformer assembly 40 on the bus conductor structure 26, as indicated at B, while power is flowing in the assumed direction from the electric circuit 22 to the electric circuit 28, the current transformer winding 116 will remain energized at one end of the protected zone which extends between the current transformer windings 116 and 120 of the current transformer assembly 40 and the circuit breaker 30, respectively, while the current transformer winding 120 will be deenergized with the operating coil 172 of the second differential protective relay DR2 which forms part of the second differential protective circuit 64 being energized by the current output from the current transformer winding 116. The energization of the operating coil 172 of the second differential protective relay DR2 will actuate its associated contact 174 to the closed position to thereby energize the tripping circuit 54 from the terminals S3 and S4 to thereby energize the tripping solenoids 152 and 144 of the circuit breakers 30 and 20, respectively. The energization of the tripping solenoids of the circuit breakers 20 and 30 will actuate or trip these circuit breakers to the open positions on the opposite sides of the fault B to thereby prevent the flow of electric power from the electric circuit 22 to the fault indicated at B.

On the other hand, if it is assumed that power, as indicated by the arrow P2 in FIG. 1, is flowing from the electric circuit indicated at 28 to the electric circuit indicated at 22, and a fault A occurs externally of the circuit breaker 20, as previously mentioned, the current transformer winding 118 of the second differential protective circuit 62 will remain energized, while the current transformer winding 110 at the other end of the protected zone will be deenergized to thereby effect the energization of the first differential protective relay DR1 which will then energize the tripping circuit 52 and in turn the tripping solenoids of the circuit breakers 10 and 20 to thereby actuate or trip the circuit breakers 10 and 20 to the open positions on the opposite sides of the fault A. Similarly, if a fault should occur externally of the circuit breaker 20 and its associated current transformer assembly 40 at the bus conductor structure 26, as indicated at B, the current transformer winding 120 of the second differential protective circuit 64 will remain energized, while the current transformer winding 116 of the current transformer assembly 40 will be deenergized to thereby effect energization of the second differential protective relay DR2 which will then energize the tripping circuit 64 and, in turn, the tripping solenoids of the circuit breakers 20 and 30. The circuit breakers 20 and 30 will then be actuated or tripped open on the opposite sides of the fault B. It is to be noted that in the electrical protective system as disclosed, that the differential protective circuits 62 and 64 respond to faults which occur externally of the bus tie circuit breaker 20 at the bus conductor structures 24 and 26 to trip open only the circuit breakers on the opposite sides of the particular fault, as just described, while the other bus conductor structure may remain energized to receive electric power from the electric circuit which is connected through one of the circuit breakers 10 or 30.

The operation of the electrical protective system as disclosed in response to faults which occur internally of a combination which includes the bus tie circuit breaker 20 and its associated current transformer assembly 40 will now be described. Assuming that electric power is flowing from the electric circuit 22 to the electric circuit 28 as indicated by the arrow P1, if an internal fault should occur in the circuit breaker 20 along the outer surface of the insulating column 212, as indicated at J, or inside the insulating column 212 along the insulating operating rod 222, as indicated at K, the current transformer winding 110 on the circuit breaker 10 will remain energized, while the current transformer winding 118 of the current transformer assembly 40 will be deenergized to thereby effect the energization of the first differential protective relay DR1 which will, in turn, actuate or trip the circuit breakers 10 and 20 to the open positions. Considering the effect of a fault at J or K on the second protective circuit 64, both of the current transformer windings 116 and 120 of the current transformer assembly 40 and the circuit breaker 30, respectively, will be deenergized by such a fault for the assumed direction of power flow, but the current transformer winding 112 at the lower end of the insulating column 212 of the circuit breaker 20 will be energized to produce an output current which will, in turn, energize the operating coil 172 of the second differential protective relay DR2. The closing of the contact 174 of the relay DR2 will then actuate or trip the circuit breaker 20 and the circuit breaker 30 to open positions. In summary, an internal fault in the circuit breaker 20 along one of the insulating columns 212 or 214, as indicated at J or K, or the insulating column 212 will be isolated by the opening of the breakers 10 and 30 on the opposite sides of the circuit interrupter 20, which will also be actuated or tripped open by the operation of the electrical protective system disclosed.

If the power flow is assumed to be in the opposite direction from electric circuit 28 to the electric circuit 22, as indicated by the arrow P2, an internal fault in the circuit breaker 20, as indicated at J or K, will cause both of the protective circuits 62 and 64 to respond in similar fashion to actuate or trip all three of the circuit breakers 10, 20 and 30 to open positions. Briefly, the current transformer winding 118 of the first protective circuit 62 will be energized, while the current transformer winding 110 will be deenergized to effect energization of the first protective relay DR1 and the tripping of the circuit breakers 10 and 20 to open positions. In the second protective circuit 64, both of the current transformer windings 116 and 120 will be energized with the output currents of said current transformer windings being vectorially balanced and with the output current from the current transformer winding 112 which is energized by such an internal fault being effective to energize the second differential protective relay DR2 and to actuate the tripping of both of the circuit breakers 20 and 30 by the second protective circuit 64.

Assuming that the power flow is from the electric circuit 22 to the electric circuit 28 as indicated by the arrow P1, if a fault should occur through the bushing insulation of the current transformer assembly 40, as indicated at N, or if a fault should occur from the conducting terminal T4 or the lower end of the bushing 294 of the breaker 20 as indicated at M and L, respectively, along the bushing 120 of the current transformer assembly 40, the current transformer winding 110 of the first protected circuit 62 will be energized, while the current transformer winding 118 of the first protective circuit 62 will be deenergized. The first protective relay DR1 will therefore be energized by the output current of the current transformer winding 110 to thereby actuate or trip the circuit breakers 10 and 20 to the open positions. Considering the second protective circuit 64, if a fault occurs as indicated at M, L or N as just mentioned, the current transformer winding 116 will be energized, while the current transformer windings 112, 114 and 120 of the second protective circuit 64 will be deenergized. The second protective relay DR2 will therefore be energized by the output current of the current transformer winding 116 to thereby actuate or trip the circuit breakers 20 and 30 open. In summary, if a fault occurs which is internal to the combination which includes the circuit breaker 20 and the current transformer assembly 40, as indicated at L, M or N, all of the circuit breakers 10, 20 and 30 will be actuated or tripped to the open positions by the electrical protective system disclosed to thereby prevent the flow of electric power to such a fault.

On the other hand, assuming that power is flowing from the electric circuit 28 to the electric circuit 22 as indicated by the arrow P2, and a fault occurs as indicated at L, M or N as just mentioned, the current transformer winding 110 of the first protective circuit 62 will be deenergized, while the other current transformer winding 118 of the first protective circuit 62 will be energized to thereby effect the energization of the first differential protective relay DR1 to actuate or trip the breakers 10 and 20 to the open positions. Considering the operation of the second protective circuit 64 for the assumed direction of power flow, the current transformer winding 120 will be energized, but the current transformer winding 116 will either not be energized at all for a fault as indicated N in which the fault current flows to the grounded framework 42 between the current transformers 116 and 118 or the fault current will flow through the current transformer winding 116 in one direction for the fault indicated at L or N and then flow in the reverse direction through the same current transformer winding to the grounded framework 42 with the second protective relay DR2 being energized by the output current from the current transformer winding 120. In the operation of the second protective circuit 64 for the assumed fault conditions the current transformer windings 112 and 114 of the circuit breaker 20 will remain deenergized for faults, as indicated at L, M or N.

Considering the overall operation of the electrical protective system shown in FIG. 1, it is important to note that the protective system responds to faults which occur externally of the combination which includes the circuit breaker 20 and the associated current transformer assembly 40 such as indicated at A or B by opening the breakers only on the opposite sides of such faults, as previously explained in detail. On the other hand, for faults which occur internally of the combination which includes the circuit breaker 20 and the associated current transformer assembly 40, the circuit breakers 10 and 30 on the opposite sides of the circuit breaker 20 are both actuated or tripped to open positions, as well as the circuit breaker 20 itself. Although the current transformer assembly 40 is conveniently and compactly mounted at only one side of the circuit breaker 20, the overall operation of the protective system disclosed is similar to that which would result if current transformer windings were disposed at each end terminal of the circuit breaker 20 at a relatively high potential or separate high voltage current transformers were provided on each side of the circuit breaker 20, as in certain conventional arrangements.

It is important to note that the operation of the protective system in FIG. 1 as just described is based upon the assumption that substantially no reverse power flow results from the circuit to which power normally flows when a fault occurs within one of the protective zones described. It is to be understood, however, that if substantial power flows in a direction which is reverse with respect to the normal direction of power flow in an actual application upon the occurrence of a fault within one of the protective zones, then the operation of the protective system shown in FIG. 1 would generally be as follows. If such substantial reverse power should occur, then certain current transformer windings which would otherwise be deenergized as previously described would be energized either to provide associated output currents which would simply circulate with respect to the output currents of associated current transformer windings or to vectorially add to the current which energizes the associated differential relay to further insure the tripping of the appropriate circuit breakers upon the occurrence of the different fault conditions previously considered.

Referring now to FIG. 2, there is illustrated an alternative construction for a bus tie circuit breaker 20' which may be employed in certain applications instead of the circuit breaker 20 as shown in FIG. 1 in order to reduce the current transformer windings which are required to cooperate in an overall electrical protective system of the type disclosed. In general, the circuit breaker structure 20' is similar to the construction of the circuit breaker 20 except that the supporting framework or means 320 which is provided to support a plurality of interrupting units or modules M1 and M2 through separate insulating columns 312 and 314, respectively, differs from the supporting framework 32 of the circuit breaker 20. In particular, the supporting framework 320 includes a horizontally disposed supporting plate 332 which is supported on a base member 339 through only one vertical conductive supporting member 334 through which all faults must flow to the grounded base 339 when a fault occurs along the outside surfaces of one of the insulating columns 312 or 314 or along the inside surfaces of one of said columns or along one of the associated operating rods which might be similar to the operating rods 222 and 224 of the breaker 20 which may be provided in a particular application. A single current transformer winding 310 may be disposed around the vertical conducting supporting member 334 instead of requiring separate current transformer windings at the lower end of each of the insulating columns 312 and 314, such as the current transformer windings 112 and 114 of the circuit breaker 20. The output leads of the current transformer 310 would be electrically connected to the leads of the second protective circuit 64 of the protective system shown in FIG. 1. It is to be understood that additional electrically insulating, vertical supporting member may be provided between the base 339 and the supporting plate 332 as required in a particular application so long as a single conductive path from each of the insulating columns 312 and 314 must pass to the grounded base member 339 through the vertical conductive member 334. The balance of the electrical protective system in which the circuit breaker 20' may be employed would be as shown in detail in FIG. 1. The current transformer winding 310 of the circuit breaker 20' would also cooperate with an associated current transformer assembly 40 and operate in an overall electrical protective system, such as shown in FIG. 1, which would offer operating advantages similar to those of an arrangement in which a circuit breaker was provided with two separate current transformer windings at the end terminals operating at relatively high potential.

It is to be understood that the teachings of the invention may be applied to a circuit breaker having as many interrupting units or modules mounted on a common supporting framework as disclosed, as required in a particular high voltage application. It is also to be understood that the various current transformer windings in an electrical protective system as disclosed may be disposed either on a magnetic core where desired or with a nonmagnetic core where more linear response is desired.

The apparatus embodying the teachings of this invention has several advantages. For example, a current transformer assembly in combination with a circuit breaker as disclosed permits the use of current transformer windings which are mounted adjacent to structures having a relatively low or grounded potential. In addition, a protective system as disclosed permits the current transformers in a current transformer assembly, as disclosed, to be mounted in a relatively compact arrangement at one side of the associated circuit breaker while retaining the same advantages of operation as separate current transformers provided at the opposite ends of a circuit breaker and operated at relatively high potentials. A current transformer assembly as disclosed may also be integrally assembled as part of an overall breaker structure or may be employed as a separate assembly, as disclosed. Finally, a protective system as disclosed has the advantage that faults along insulating operating rods in a circuit breaker of the type having a plurality of interrupting units mounted on a common supporting means may be readily sensed to control the tripping of the necessary circuit breakers.

In the second embodiment of the applicant's invention, the number of current transformers provided as part of a circuit breaker and operating at relatively low potentials is reduced compared with certain known arrangements.

Since numerous changes may be made in the above-described apparatus, and different embodiments of the invention may be made without departing from the spirit and scope thereof, it is intended that all the matter contained in the foregoing description or shown in the accompanying drawings shall be interpreted as illustrative and not in a limiting sense.

What is claimed is:

1. In combination, a circuit interrupter having separable contacts supported on a metal supporting means through an insulating column, a current transformer assembly mounted at one side of the interrupter and comprising a pair of axially spaced current transformer windings mounted on and intermediate the ends of an elongated insulating bushing having a conducting member extending axially therethrough, the conducting member being electrically connected in series with the contacts of the interrupter, said bushing being supported intermediate its ends and between the current transformer windings on a metal supporting means, first metal shielding disposed between said current transformer windings and said bushing and extending axially between and beyond the current transformer windings in each direction, the metal shielding being electrically connected to the last-mentioned supporting means to insure that any faults along the bushing to the supporting means will flow through the shielding which passes through only one of the pair of current transformer windings, a third current transformer winding disposed between the insulating column and associated supporting means, and second metal shielding disposed inside the third current transformer winding and extending between the supporting means and the adjacent insulating column to insure that any faults along the insulating column to the associated supporting means will flow through the shielding inside the third current transformer winding to the supporting means.

2. The combination as claimed in claim 1 wherein a first differential protective means is connected in circuit relation with and is responsive to at least one of the pair of current transformer windings in a first protective circuit and a second differential protective means is connected in circuit relation with and is responsive to at least the other of the pair of current transformer windings and the third current transformer winding in a second protective circuit, said first and second protective circuits overlapping by at least the spacing between the pair of current transformer windings.

3. The combination as claimed in claim 1 wherein the insulating column is tubular in configuration and an insulating operating member is operatively connected to the separable contacts through the tubular insulating column, the third current transformer winding and the second metal shielding.

4. In combination, a circuit breaker comprising a plurality of circuit interrupting units each having separable contacts supported on a common grounded supporting means through a separate insulating column, the separable contacts of the interrupting units being electrically connected in series, a current transformer assembly mounted on one side of the breaker and including a pair of axially spaced current transformer windings mounted on and intermediate the ends of an elongated insulating bushing having a conductor extending axially through the bushing and electrically connected in series with the separable contacts of the interrupting units, the bushing being supported at its mid portion between the pair of current transformer windings on a metal supporting means, conductive shielding disposed between the pair of current transformer windings and the bushing and extending axially between and beyond the pair of current transformer windings in each direction, the conductive shielding being electrically connected to the last-mentioned supporting means to provide a path for any fault along the bushing to the associated supporting means through the conductive shielding which passes through only one of the pair of current transformer windings, a third current transformer winding disposed on the supporting means which supports the insulating columns to encompass all paths which a fault along any insulating column might follow to the grounded portion of the associated supporting means.

5. The combination as claimed in claim 4 wherein a first differential protective means is connected in circuit relation with and is responsive to at least one of the pair of current transformer windings in a first protective circuit and a second differential protective means is connected in circuit relation with and is responsive to at least the other of the pair of current transformer windings and the third current transformer winding in a second protective circuit, said first and second protective circuit overlapping by at least the space between the pair of current transformer windings.

6. The combination as claimed in claim 4 wherein each insulating column is tubular in configuration and a separate insulating operating member is operatively connected to the separable contacts of each interrupting unit through the associated insulating column whereby any fault along each insulating operating member will flow to the grounded portion of the common supporting means through a path which passes through the third current transformer winding.

7. In combination, a circuit breaker comprising a plurality of circuit interrupting units each having separable contacts supported on a common metal supporting means through a separate insulating column, the separable contacts of the interrupting units being electrically connected in series when closed, a current transformer assembly disposed on one side of the breaker and comprising a pair of axially spaced current transformer windings mounted on and intermediate the ends of an elongated insulating bushing, said bushing having a conductor extending axially therethrough and electrically connected in series with the separable contacts of the interrupting units, the bushing being supported intermediate its ends between the pair of current transformer windings on a conducting supporting means, conductive shielding disposed on the pair of current transformer windings and the bushing and extending axially along the bushing between and beyond the pair of current transformer windings in each direction, the conductive shielding being electrically connected to the last-mentioned supporting means to provide a path for any fault along the bushing to the associated supporting means through the conductive shielding which passes through only one of the pair of current transformer windings, an additional current transformer winding disposed between each insulating column and the common supporting means, and additional conductive shielding disposed inside each additional current transformer winding and extending between the common supporting means and the associated insulating column to provide a path for any fault along each insulating column to the common supporting means through the associated additional conductive shielding which passes through the associated current transformer winding.

8. The combination as claimed in claim 7 wherein a first differential protective means is in circuit relation with and is responsive to at least one of the pair of current transformer windings in a first protective circuit and a second differential protective means is connected in circuit relation with and is responsive to at least the other of the pair of current transformer windings and all of the additional current transformer windings in a second protective circuit which overlaps the first protective circuit by at least the spacing between the pair of current transformer windings.

9. The combination as claimed in claim 7 wherein each insulating column is tubular in configuration and a separate insulating operating member is operatively connected to the separable contacts of each interrupting unit through the associated insulating column whereby any fault along each insulating operating member will flow through the associated additional conductive shielding which passes through the associated additional current transformer winding.

References Cited

UNITED STATES PATENTS

| | | | |
|---|---|---|---|
| 2,374,054 | 4/1945 | Travers et al. | 317—26 |
| 2,804,576 | 8/1957 | Coggeshall et al. | 317—58 X |
| 2,804,577 | 8/1957 | Roth | 317—28 |
| 2,862,194 | 11/1958 | Coggeshall et al. | 336—173 |
| 3,032,689 | 5/1962 | Baker et al. | 317—58 X |
| 3,105,172 | 9/1963 | Abel et al. | 317—15 |
| 3,164,703 | 1/1965 | Friedrich et al. | 200—148 |
| 3,227,925 | 1/1966 | Cook | 317—58 |

MILTON O. HIRSHFIELD, *Primary Examiner.*

J. D. TRAMMELL, *Assistant Examiner.*